(12) United States Patent
Daniel et al.

(10) Patent No.: US 7,836,967 B2
(45) Date of Patent: Nov. 23, 2010

(54) COOLING SYSTEM PACKAGING ARRANGEMENT FOR A MACHINE

(75) Inventors: Steven A. Daniel, East Peoria, IL (US); Avert Glen Vannette, Washington, IL (US); Daniel Peter Sergison, East Peoria, IL (US); Norval P. Thomson, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 165 days.

(21) Appl. No.: 12/181,161

(22) Filed: Jul. 28, 2008

(65) Prior Publication Data
US 2010/0018732 A1   Jan. 28, 2010

(51) Int. Cl.
   *B62D 33/00*   (2006.01)
   *E02F 3/80*    (2006.01)
(52) U.S. Cl. .................................. 172/781; 180/89.12
(58) Field of Classification Search ........... 172/781, 172/788, 789, 786, 793, 791, 792; 180/68.21, 180/68.3, 68.4, 89.12, 89.1, 68.1, 68.2; 280/787, 280/785, 790; 296/183, 193, 194, 195; 440/88 R, 440/88 C
See application file for complete search history.

(56) References Cited

U.S. PATENT DOCUMENTS

| | | | |
|---|---|---|---|
| 1,227,770 A | 5/1917 | Fleischmann | |
| 1,747,868 A | 3/1927 | Guernsey | |
| 2,115,124 A | 4/1936 | Schittke | |
| 2,146,501 A | 2/1939 | Flautt | |
| 2,756,026 A | 7/1956 | Myrent et al. | |
| 3,454,109 A | 7/1969 | Roberts | |
| 3,472,042 A | 10/1969 | Shriver et al. | |
| 3,637,036 A | 1/1972 | Swisher, Jr. et al. | |
| 3,865,205 A * | 2/1975 | Swanson | 180/12 |
| 3,894,603 A * | 7/1975 | Winzeler | 180/53.1 |
| 3,933,136 A * | 1/1976 | Burst | 123/41.58 |
| 3,964,449 A | 6/1976 | Thien et al. | |
| 4,034,804 A | 7/1977 | Meijer et al. | |
| 4,049,072 A | 9/1977 | Savage | |
| 4,071,090 A * | 1/1978 | Easterling | 172/788 |
| 4,076,072 A | 2/1978 | Bentz | |
| 4,081,050 A * | 3/1978 | Hennessey et al. | 180/233 |
| 4,105,085 A | 8/1978 | van der Lely | |
| 4,114,716 A | 9/1978 | Sanders | |
| 4,116,265 A | 9/1978 | Staebler | |
| 4,117,902 A * | 10/1978 | Henline et al. | 180/54.1 |
| 4,177,870 A | 12/1979 | Henn | |
| 4,341,282 A * | 7/1982 | Bird | 181/114 |
| 4,355,944 A | 10/1982 | Lorenc | |

(Continued)

FOREIGN PATENT DOCUMENTS

EP   0564501   11/1994

(Continued)

*Primary Examiner*—Robert E Pezzuto
(74) *Attorney, Agent, or Firm*—Leydig, Voit & Mayer

(57) ABSTRACT

A radiator of a cooling system is disposed within an engine compartment, between a rear mounted engine and a cab on a wheeled machine. The remaining components within the engine compartment are arranged such that they are lower in height than the radiator, the engine compartment enclosure generally angling down from the cab rearward. The enclosure includes an air intake that opens into a gap between the enclosure and cab. A fan disposed rearward the radiator may pull cooling air through the air intake and past the radiator.

20 Claims, 6 Drawing Sheets

U.S. PATENT DOCUMENTS

| | | | |
|---|---|---|---|
| 4,542,786 A | 9/1985 | Anders | |
| 4,546,820 A | 10/1985 | Whipple | |
| 4,546,844 A | 10/1985 | Stauffer | |
| 4,549,610 A | 10/1985 | van der Lely | |
| 4,574,868 A | 3/1986 | Anders | |
| 4,606,442 A | 8/1986 | Paton et al. | |
| 4,657,070 A | 4/1987 | Kluppel | |
| 4,696,361 A | 9/1987 | Clark et al. | |
| 4,773,219 A | 9/1988 | Bagwell | |
| 4,815,550 A | 3/1989 | Mather et al. | |
| 4,832,116 A | 5/1989 | Easton | |
| 4,917,201 A * | 4/1990 | Fujikawa et al. | 180/68.2 |
| 4,995,241 A | 2/1991 | Vandervaart | |
| 5,033,567 A * | 7/1991 | Washburn et al. | 180/89.12 |
| 5,188,193 A | 2/1993 | Schroeder | |
| 5,844,333 A | 12/1998 | Sheerin | |
| 6,129,056 A | 10/2000 | Skeel et al. | |
| 6,167,976 B1 | 1/2001 | O'Neill et al. | |
| 6,257,359 B1 | 7/2001 | Granlund et al. | |
| 6,283,237 B1 | 9/2001 | Muller | |
| 6,378,605 B1 | 4/2002 | Kutscher et al. | |
| 6,386,306 B2 | 5/2002 | Contoli et al. | |
| 6,408,969 B1 | 6/2002 | Loberr et al. | |
| 6,431,299 B1 * | 8/2002 | Asche et al. | 180/68.1 |
| 6,435,264 B1 | 8/2002 | Konno et al. | |
| 6,474,272 B2 | 11/2002 | Bensing et al. | |
| 6,508,328 B1 | 1/2003 | Kenyon et al. | |
| 6,732,681 B1 | 5/2004 | Hendricks, Sr. | |
| 6,793,028 B2 | 9/2004 | Pack | |
| 6,883,314 B2 | 4/2005 | Callas et al. | |
| 6,951,492 B2 * | 10/2005 | Gibbs | 440/88 C |
| 7,028,646 B1 | 4/2006 | Wagner | |
| 7,204,329 B2 | 4/2007 | Pfohl et al. | |
| D557,715 S | 12/2007 | Merghani et al. | |
| 2005/0217907 A1 | 10/2005 | Madson et al. | |
| 2006/0113121 A1 | 6/2006 | Radke et al. | |
| 2007/0007061 A1 | 1/2007 | Meyer et al. | |

FOREIGN PATENT DOCUMENTS

| | | |
|---|---|---|
| EP | 1002685 | 5/2000 |
| JP | 2007023508 | 2/2007 |

* cited by examiner

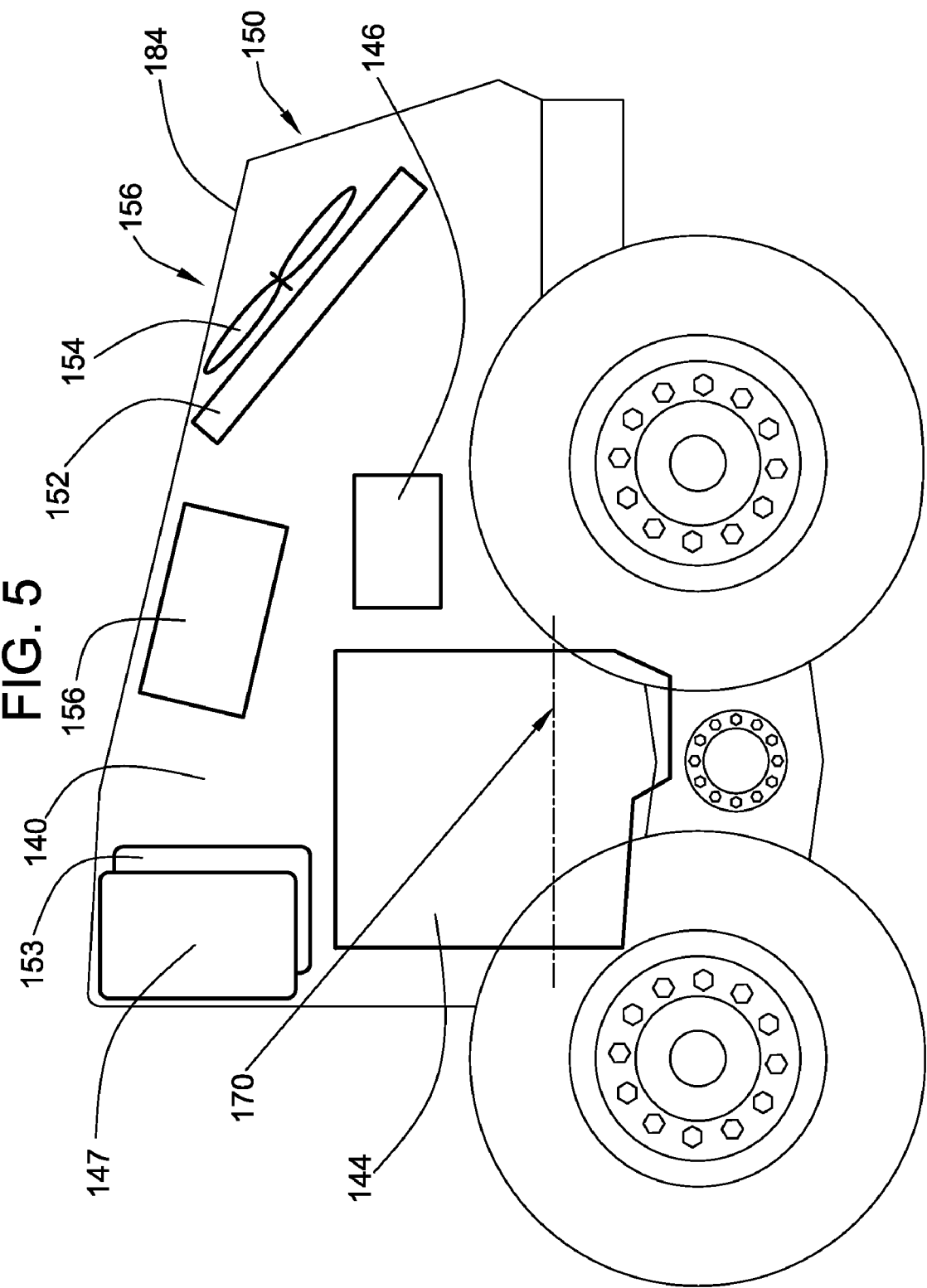

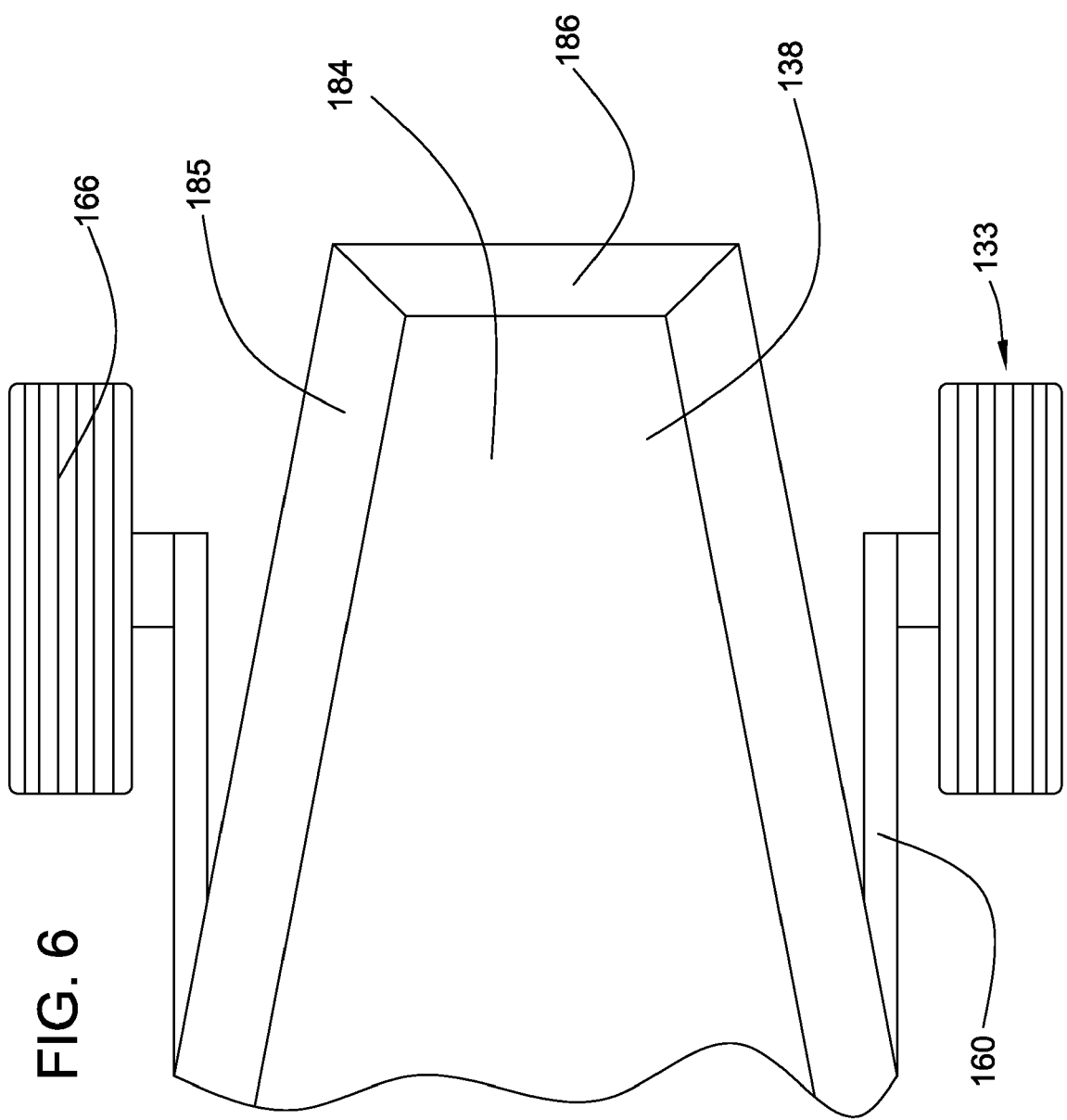

COOLING SYSTEM PACKAGING ARRANGEMENT FOR A MACHINE

TECHNICAL FIELD

This patent disclosure relates generally to engine compartment packaging for use in a machine and, more particularly to a cooling system packaging arrangement to enhance visibility for the operator of such a machine.

BACKGROUND

Machines such as motor graders, wheel loaders, excavators, backhoes, and material handlers or the like typically perform operations associated with industries such as mining, construction, farming, transportation, or the like. Implements associated with these machines may be employed for a variety of tasks, including, for example, loading, compacting, lifting, leveling, and brushing, and include, for example, buckets, compactors, forked lifting devices, brushes, grapples, cutters, shears, blades, breakers/hammers, augers, and others.

Obstructions in an operator's view of the areas surrounding the machine, as well as an associated implement, can inhibit efficient and effective operation of the machine. As a result, it is desirable to provide the operator with optimal visibility of the surrounding terrain and objects about the machine. The operator's information concerning the surrounding terrain and objects about the machine may be obtained from remote information, as from others not seated in the machine, or from a direct sightline, an indirect sightline, as through mirrors or the like, and auxiliary equipment, as from associated cameras or the like.

Many of the conventional machines available as of the submission of this disclosure do not provide desired visibility without the use of auxiliary equipment to supplement the operator's direct or indirect sightline. With motor graders and other machines that include rear mounted engines, for example, a considerable volume of equipment is placed in the rearwardly disposed engine compartment. Such equipment may include, for example, a hydraulic system including one or more pumps and a sump, an engine, a transmission, a cooling system, and aftertreatment equipment, such as sound or pollution dissipating equipment. For example, U.S. Pat. No. 4,546,844 to Stauffer discloses a motor grader that includes a plurality of windows to provide the operator a view out of all sides of the cab 22. In view of the size of the engine compartment housing 24, however, even if the entire rear of the cab was open, a seated operator could not see a person standing behind the machine, either directly or through the use of mirrors. Although a hydraulic oil cooler 37 appears to be provided external to the engine compartment housing, the remaining equipment disposed within the housing, including the hydraulic oil reservoir or sump 102, the pump 34, the engine, the transmission 35, and the transfer case 39 result in a relatively large and obstructive engine compartment housing 24.

Auxiliary equipment may include, for example, strategically placed cameras and monitors. Such auxiliary equipment, however, can not only be a considerable initial investment, maintenance and upkeep may likewise prove to be expensive, particularly because such equipment is typically operated and maintained in outdoor, sometimes, harsh environments. Additionally, such machinery often operates in rugged environments that could dirty and damage sophisticated electrical equipment. If a camera lens is covered with dirt, or impacted with a rock, for example, the result could be an auxiliary system that is no longer operative to meet the demands of the operator. Moreover, the size and efficient operation of the various components within the engine compartment generally make the reduction of the size of the engine housing itself prohibitive.

The present disclosure is directed to overcoming one or more of the problems and shortcomings of the art as set forth above.

SUMMARY

The disclosure describes, in one aspect, a machine for use on terrain. The machine comprises a mainframe and a cab disposed on the mainframe. The mainframe is supported by at least two ground engaging members rotatably coupled thereto. An engine compartment is defined along the mainframe. Disposed within the engine compartment is an engine and a cooling package including a radiator, both the engine and the cooling package being coupled to the mainframe. The radiator is at least partially vertically disposed, and is located forward the engine and rearward the cab. At least one enclosure at least partially encloses the engine compartment. The enclosure includes at least one air intake forward the radiator and rearward the cab and in line between the radiator and the cab.

The disclosure describes, in another aspect, a hydrostatically driven machine that comprises a mainframe and a cab disposed on the mainframe. The mainframe is supported by at least two ground engaging members rotatably coupled thereto. The pairs of wheels are adapted to turn about respective axes, the axes defining a plane through the machine. The machine further comprises an engine having a crankshaft and a cooling package including a radiator. The centerline of the crankshaft is disposed, at most, substantially 250 mm above the plane.

The disclosure describes, in another aspect, a hydrostatically driven motor grader adapted to carry an operator. The motor grader comprises an articulated mainframe including a front frame section and a rear frame section, the frame sections being articulated relative to one another. At least one front wheel is rotatably coupled to the front frame section, and at least two ground engaging members are rotatably coupled to the rear frame section. An engine, at least one pump, and a cooling package including a radiator are coupled to the rear frame section. A cab adapted to carry an operator is disposed on the mainframe. An enclosure is coupled to the rear frame section rearward the cab and generally covers at least a portion of the engine, the pump, and the cooling package. The enclosure includes an upper surface, the upper surface being disposed at an angle of 15° to 30° to horizontal and to provide the operator a sightline to a one and one half meter high obstacle disposed one meter from the motor grader.

BRIEF DESCRIPTION OF THE DRAWING(S)

FIGS. 3-5 are schematic views similar to FIG. 2 of alternate embodiment arrangements.

FIG. 6 is a top plan view of a rear frame portion according to another embodiment.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
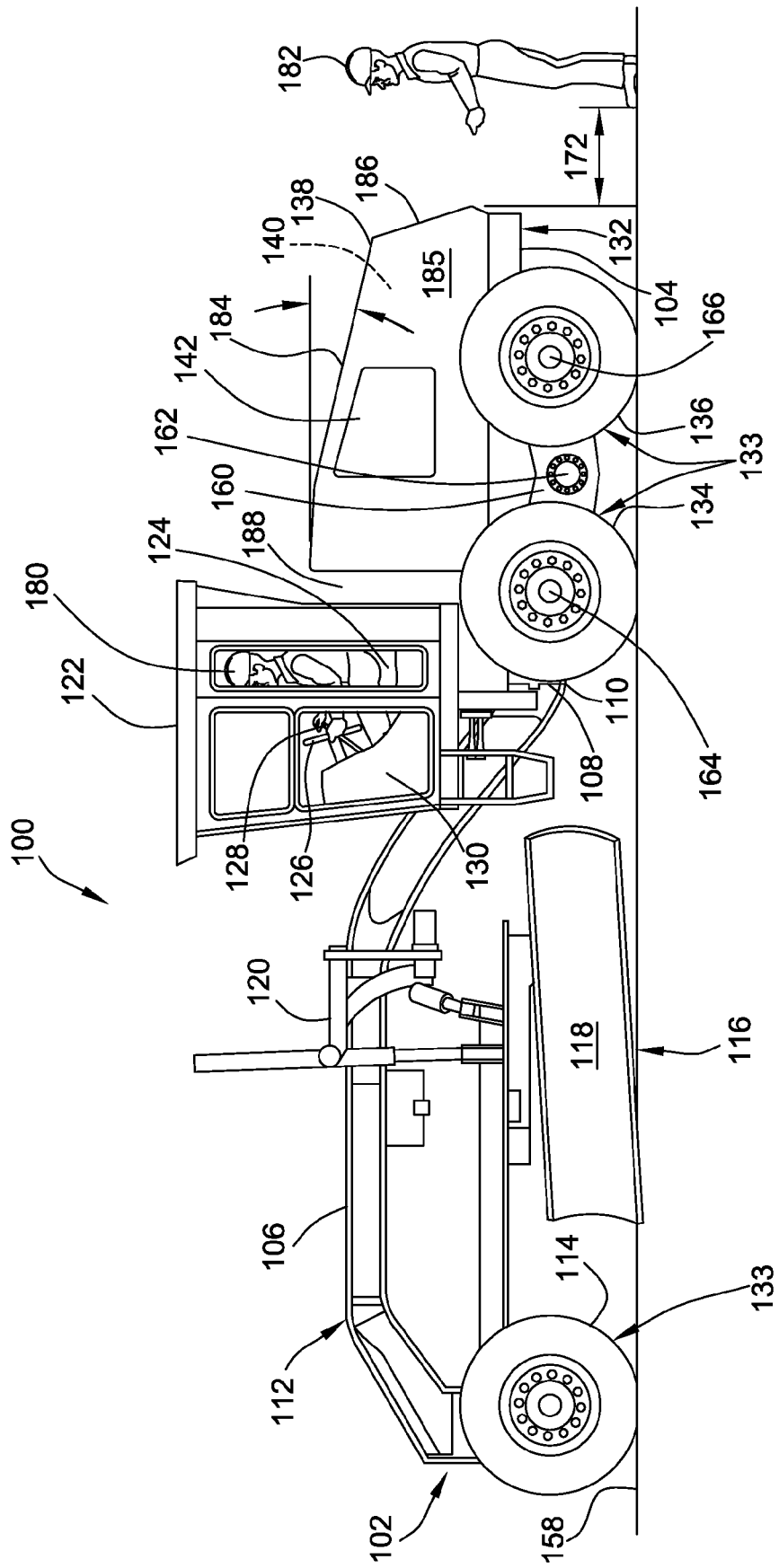
FIG. 1 is a schematic side elevational view of an exemplary machine incorporating features of the disclosure, the cab partially broken away.

Turning now to the drawings, an exemplary embodiment of a machine 99 in the form of a motor grader 100 is illustrated in FIG. 1. It will be appreciated that, although a motor grader 100 is illustrated in FIG. 1, the term "machine" may refer to any machine that performs some type of operation associated with an industry such as mining, construction, farming, transportation, or any other industry known in the art. For example, a machine 99 may be an earth-moving machine, such as a wheel loader, excavator, backhoe, motor grader, material handler or the like, and, in particular, any machine that includes a rear mounted engine.

The motor grader 100 includes a mainframe 102 having a rear frame portion 104 and a front frame portion 106. The rear and front frame portions 104, 106 may optionally be articulated at an articulated joint 108, which includes a hinge 110 (not visible). The mainframe 102 is supported on a plurality of ground engaging members 113. In the illustrated embodiment, the ground engaging members 113 include a plurality of pairs of wheels 114, 134, 136. It will be appreciated, however, that the ground engaging members 113 may include alternate arrangements, such as, for example, track assemblies. The front frame portion 106 includes a front frame section 112 supported between the hinge 110 and ground engaging members 113, such as the illustrated pair of front wheels 114. A blade assembly 116 is mounted along the front frame section 112 and may be utilized for grading. The blade assembly 116 includes a blade 118 and a linkage assembly 120 that allows the blade 118 to be moved to a variety of different positions relative to the motor grader 100.

Although an exemplary blade 118 is illustrated as the attached implement, an alternate implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

Returning to the illustrated embodiment, an operator cab 122 is also supported along the front frame section 112. The cab 122 may include, for example, a seat 124, a steering mechanism 126, a speed-throttle or control lever 128, and a console 130. An operator occupying the cab 122 can control the various functions and motion of the motor grader 100, for example, by using the steering mechanism 126 to set a direction of travel for the motor grader 100 or by using the control lever 128 to set the travel speed of the machine. As can be appreciated, the representations of the various control mechanisms presented herein are generic and are meant to encompass all possible mechanisms or devices used to convey an operator's commands to a machine. While an operator cab 122 is shown in the illustrated embodiments, the inclusion of such a cab and associated seat, control mechanisms and console are optional in that the machine could alternately be autonomous, that is, the machine may be controlled by a control system that does not require operation by an on-board human operator.

Figure 2:
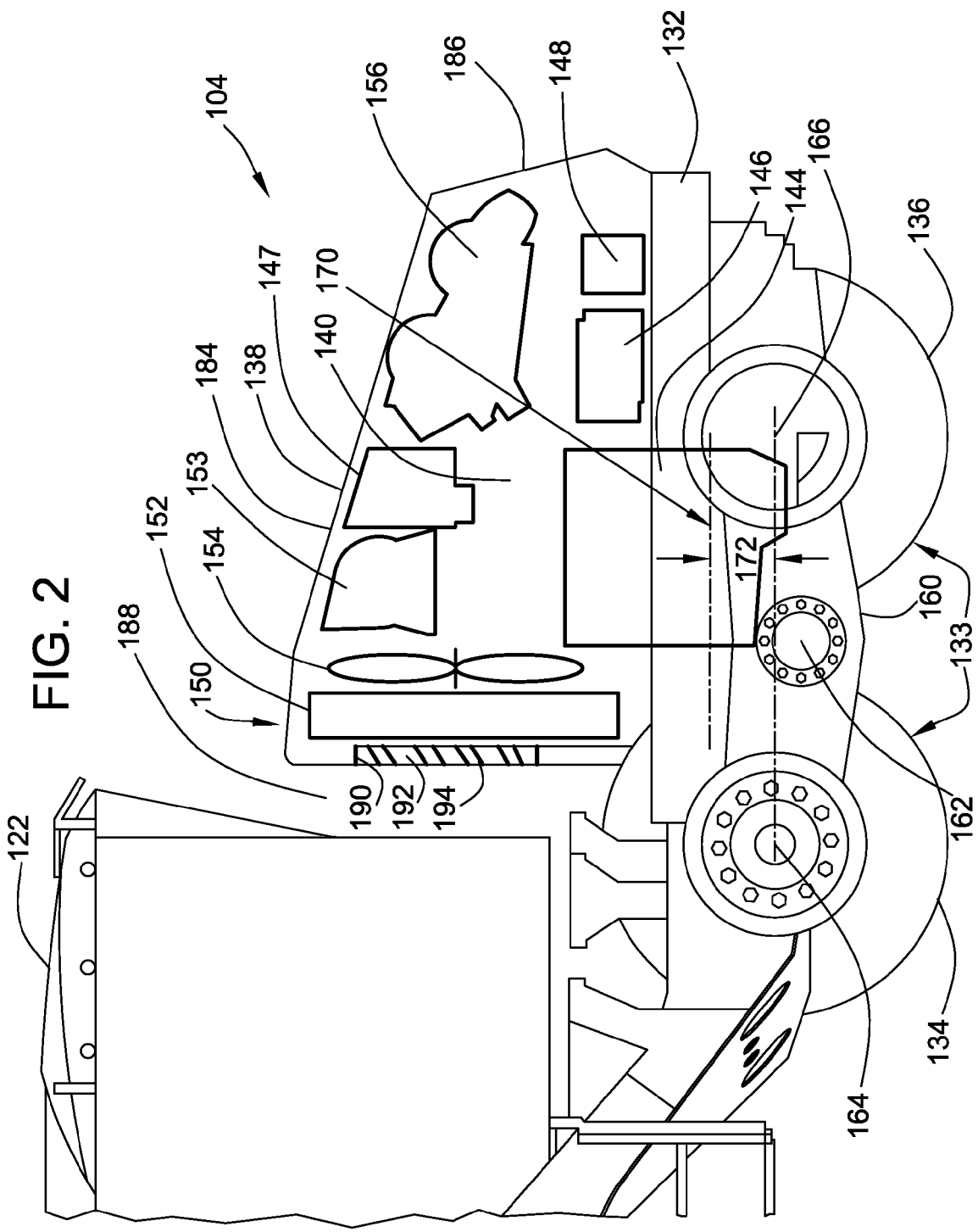
FIG. 2 is an enlarged partial cross-sectional view of the rear frame section of the machine of FIG. 1.

The rear frame portion 104 includes a rear frame section 132 that is supported on a plurality of ground engaging members 113. In the illustrated embodiment, the ground engaging members 113 supporting the rear frame section 132 include the two pairs of rear wheels 134, 136 illustrated. An enclosure 138 is secured to the rear frame section 132 to form an engine compartment 140. The enclosure 138 may include one or more access doors 142, which allow access to the interior of the engine compartment 140 and the components contained therein. Turning to FIG. 2, an engine 144 disposed within the engine compartment 140 may be coupled to the rear frame section 132 and may drive or power ground engaging devices, such as two or more of the wheels 114, 134, 136 on the motor grader 100, and/or a hydraulic system for operating a steering system, including, for example, a pump 146 and a tank 147, an implement, such as the illustrated blade assembly 116 adapted to drive the ground engaging devices 114, 134, 136. It is noted that the pump 146 may be disposed lower than the tank 147 in the engine compartment 140 in order to provide positive feed from the tank 147 to the pump 146. Similarly, a battery 148, an electrical drive system (not illustrated), and a cooling package 150 may be coupled to the rear frame section 132 and disposed within the enclosure 138.

According to the disclosure, the cooling package 150 is disposed within the enclosure 138, directly behind the cab 122. The cooling package 150 may include components to treat any or all of the engine coolant, the hydraulic or power train system, or the engine air system. In any event, however, the cooling package 150 includes at least one radiator 152, and, generally, at least one fan 154, and may include one or more air or oil heat exchangers 153. Placement of the cooling package 150 at a forward location within the enclosure 138, that is, proximal to the cab 122, may provide additional enhancements to the operation of the cooling package 150 itself. The cab 122, which is disposed on the front frame section 112, may be spaced from the enclosure 138, which is disposed on the rear frame section 132, providing an airflow gap 188 therebetween, as illustrated, for example, in the figures. To provide efficient operation of the cooling package 150, the enclosure 138 may include an air intake 190 between the cooling package 150 and the cab 122, the air intake 190 opening into this airflow gap 188. The gap 188 may be of any appropriate dimension to provide desirable airflow. For example, the gap 188 may be 250 mm, or may fall within a range such as 200 mm-300 mm, although these dimensions are provided as examples only, and the gap 188 may be smaller or greater than these exemplary dimensions. Thus, with the engine 144 disposed rearward the cooling package 150, cooling, ambient air is provided to the radiator 152 from forward the engine 144, rather than from the heated air generally exiting the engine compartment 140 toward the rear of the motor grader 100. More particularly, in the illustrated embodiment the fan 154 pulls air through the air intake 190 and past the radiator 152, although an alternate disposition may be provided. The illustrated air intake 190 includes a plurality of openings 192 with louvers 194, which generally shield the openings 192 from the entry of debris, yet provide a free flow of cooling air to the radiator 152. The air intake 190 may alternately include a single or different number of openings 192, and may or may not include some sort of shield cover or air flow director.

In addition to possible enhancement of the operation of the cooling package 150 itself, the disclosed arrangement may provide enhancement visibility of the surrounding terrain 158 around the machine 99. Inasmuch as the radiator 152 is typically the tallest component within the engine compartment 140, placement of the cooling package 150, including the radiator 152 proximal the forward end of the engine compartment 140, i.e., adjacent the cab 122, may provide for efficient packaging of the remaining components within the enclosure 138. In the embodiment illustrated in FIG. 2, the radiator 152 is disposed substantially adjacent the forward end of the enclosure 138, in a substantially vertical, substantially lateral position relative to the motor grader 100. The engine 144, hydraulic system pump 146 and tank 147, and, optionally, any aftertreatment equipment 156, such as, for example, sound abatement equipment, such as a muffler, or emission reduction equipment, such as a diesel particulate filter, may generally be disposed relatively lower within the engine compartment 140, and generally rearward the radiator 152. In other words, the radiator 152 defines the tallest location of the components disposed within the engine compartment 140. As a result, the enclosure 138 may angle downward from an area proximal the cab 122 to the rear of the motor grader 100. It will be appreciated that this reduction in the height of the enclosure 138 distal the cab 122 provides an operator within the cab 122 with an enhanced view of the terrain 158 surrounding the motor grader 100. The term "rearward" as used in this disclosure is intended to describe the relative position along the length of the machine 99.

This strategic placement of components within the engine compartment 140 is particularly applicable in machines 99 that do not include equipment typically included in conventionally motivated machines. For example, in some embodiments, the elimination of a transmission provides additional space within the engine compartment 140. Further, one or more axles that would otherwise extend laterally through the engine compartment 140 may be eliminated from the machine 99, allowing for placement of other engine components within that portion of the engine compartment 140. For example, a hydrostatically motivated machine 99, such as is illustrated in the figures, as well as electronic drive machines may not include such a laterally extending axle. Rather, they may include a the wheel hub may be driven by one or more hydraulic or electric motors. By way of a more specific example, in the motor grader 100 illustrated in FIG. 1, the pairs of rear wheels 134, 136 are disposed on a frames 160 along either side of the motor grader 100, the frames 160 being rotatably coupled at axis 162 to the rear frame section 132. If no laterally disposed axle is provided along axis 162, components within the engine compartment 140 may be disposed within the space that would otherwise be occupied by such an axle.

Similarly, as may be seen in FIG. 2, the pairs of rear wheels 134, 136 are mounted to rotate about respective axes 164, 166, which are disposed within a plane 168. While each pair of wheels 134, 136 may include laterally extending axles, it is noted that laterally extending axles are unnecessary when driving rotation is imparted to the wheels 134, 136 via a hydrostatic or electronic drive system. As a result, components within the engine compartment 140 may approach or even impinge into the space otherwise reserved for such axles. Thus, as the engine 144 may be disposed in comparatively lower positions in the engine compartment 140, the centerline of the crankshaft axis 170 may disposed near the plane 168, within the plane 168, or even below the plane 168 of the axes 164, 166. It will be appreciated that this efficient packaging arrangement maybe further enhanced when the cooling package 150, and, more particularly, the radiator 152 is disposed in the forward portion of the engine compartment 140, that is, proximal the cab 122. According to the embodiment illustrated in FIG. 2, for example, the engine 144 is located at a relatively low position within the engine compartment 140. In an embodiment, the centerline of the crankshaft 170 of the engine 144 may be disposed within a distance 172 of approximately 250 millimeters or less above the plane 168. The crankshaft axis 170 may be disposed closer to or more distant from the plane 168. It will be appreciated that greater efficiencies may be realized by placement of the crankshaft 170 of the engine 144 closer to or below the plane 168 inasmuch as additional space may be realized within the engine compartment 140, which may result in lowering the height of the upper surface 184 of the enclosure 138.

As shown in FIG. 1, the angling of the upper surface 184 of the enclosure 138 may provide an operator 180 located within the cab 122 with a desirable sightline to objects 182 disposed along the surrounding terrain 158. The enclosure 138 includes an upper surface 184, side walls 185, and rear wall 186. The upper surface 184 of the enclosure 138 may be disposed at an angle to horizontal, such as, for example, angles on the order of 15° to 30° from horizontal. For the purposes of this disclosure, the term upper surface 184 will be measured in the fore-aft direction of the machine 99, at a lateral center point of the enclosure 138. In this way, the angling of the upper surface 184 of the enclosure 138 may provide the operator 180 with a view to objects 182 that would otherwise be obstructed by the enclosure 138. For example, the angling may provide an operator 180 with a view over the enclosure 138 to a one and one half meter tall person 182 standing one meter back from the rear of the motor grader 100. In other words, an operator 180 within the cab 122 would see a one and one half meter high object 182 disposed at a one meter boundary 172 about the motor grader 100. It has been determined that the arrangement shown in FIG. 1, in particular, wherein the upper surface 184 is disposed at an angle of 16° to 20° would permit a standard operator 180 seated in the cab 122 to see a one and one half meter tall person 182 disposed at the one meter boundary 172, eye-to-eye, allowing the motor grader 100 to meet the standard without the inclusion of costly surveillance equipment, such as cameras and display equipment.

Figure 3:
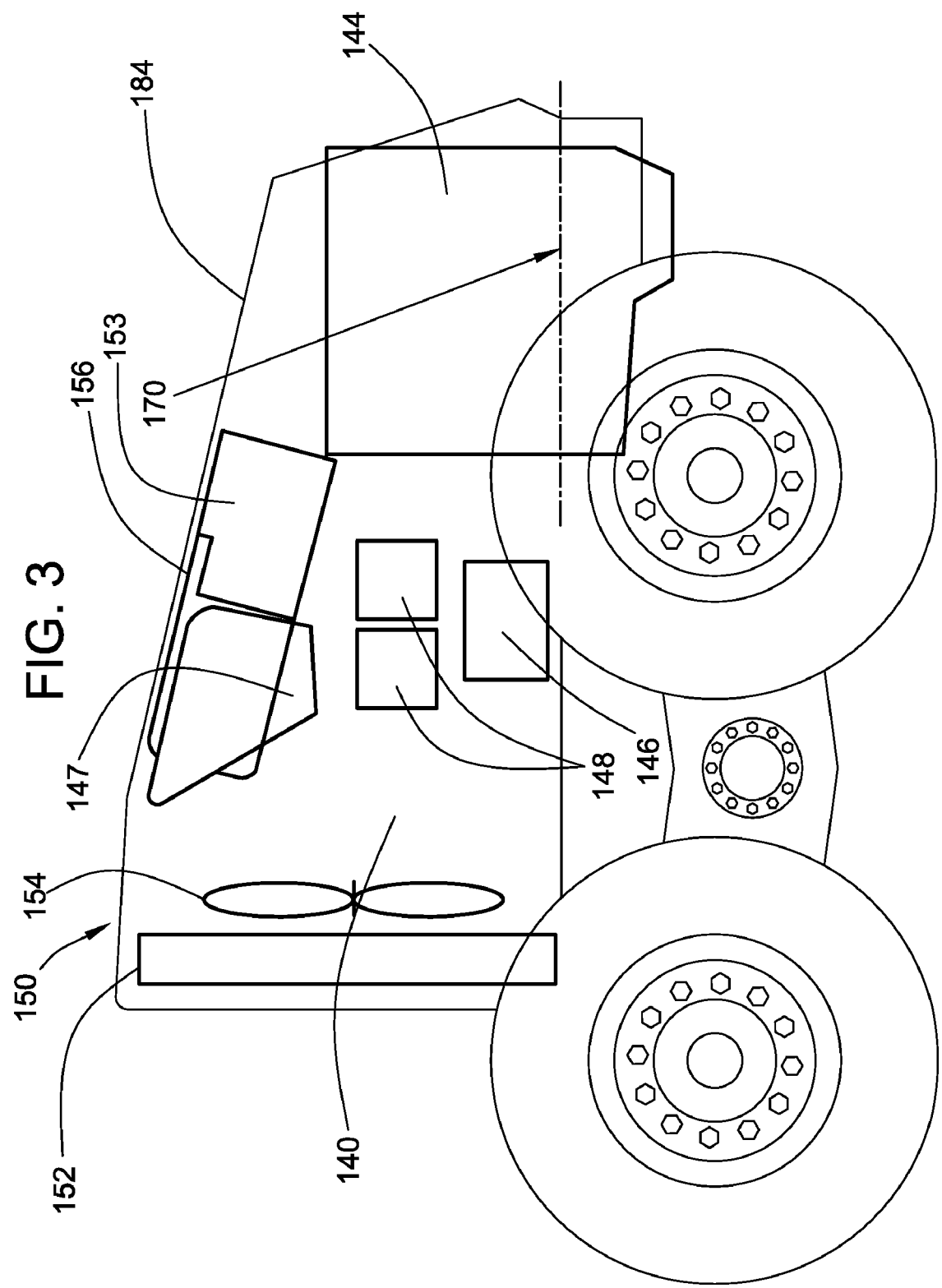
Figure 4:
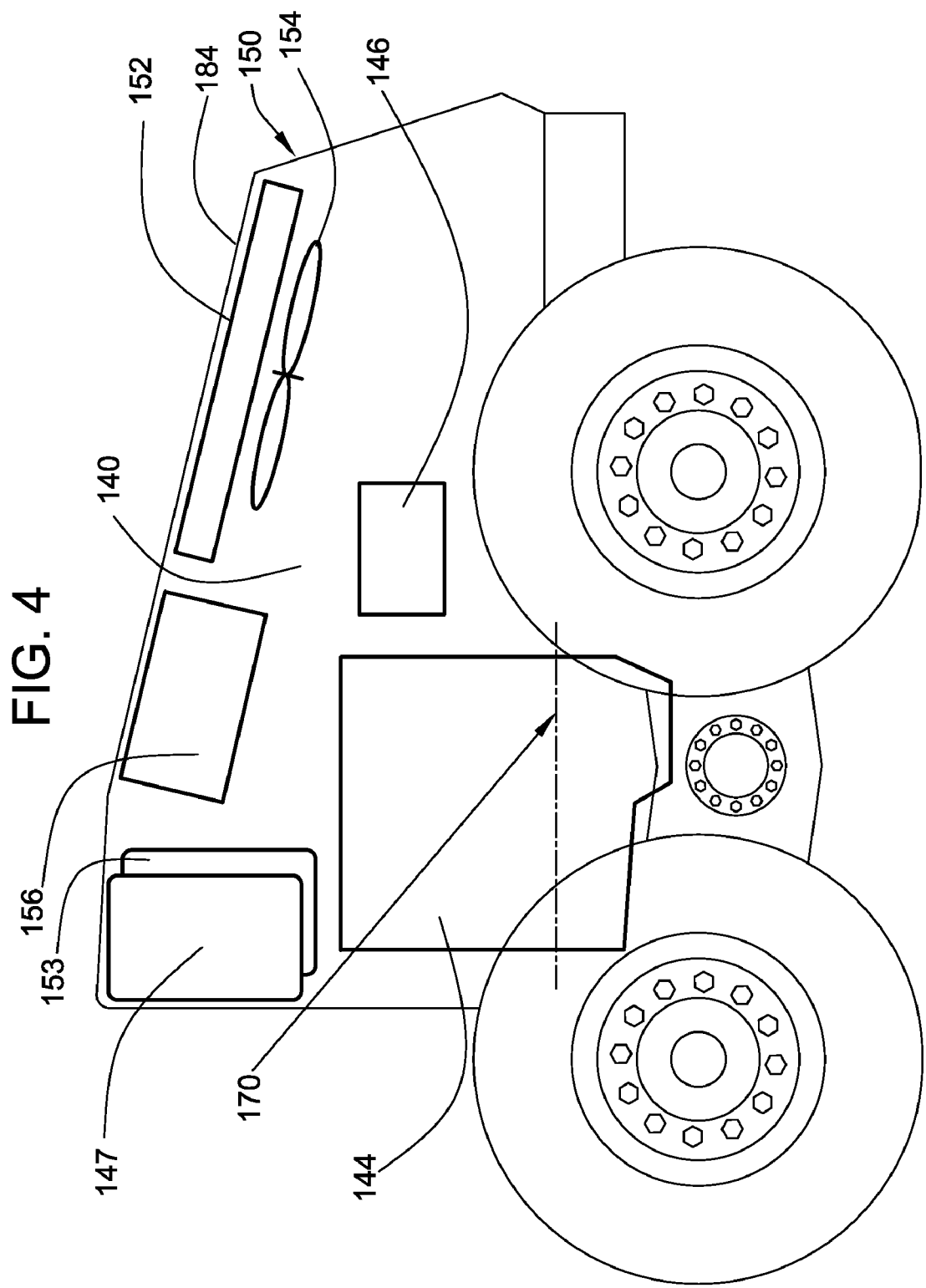

Alternate arrangements of the various components within the engine compartment 140 are shown, for example, in FIGS. 3-5. For ease of reference, the same reference numbers for the components are utilized in these figures. More specifically, the engine 144, optionally, the hydraulic system, including, for example, a pump 146 and a tank 147, the cooling package 150, including the radiator 152, and the optional aftertreatment equipment 156 may be disposed in various ways within the engine compartment 140 while likewise allowing the downward angling of the upper surface 184 of the enclosure 138. As shown in FIG. 6, the components may further be arranged to allow the side walls 185 of the enclosure 138 to angle outward. It will be appreciated that the representations illustrated are merely illustrative, and the actual structure and outline of the various components and systems may be other than as shown.

INDUSTRIAL APPLICABILITY

The present disclosure is applicable to any machine 99 with a rear mounted engine 144 and a cooling package 150. The proposed packaging arrangement may offer considerable advantages of conventional placement of the cooling package 150 at the rear edge of the engine compartment 140. Placement of the cooling package 150, and the radiator 152 in particular, substantially adjacent the forward end of the engine compartment 140, that is, near the cab 122 of the machine 99, may allow for efficient operation of the cooling package 150. Inasmuch as heat producing components, such as the engine 144, optionally, any after treatment equipment 156, and, optionally, the hydraulic system pump 146 and tank 147, compressors, etc., are placed rearward of the cooling package 150, some heat from such components may exit the engine compartment 140 to the rear of the machine 99, rather than through the cooling package 150. In this way, the cooling package 150 need not work against all of the heat produced by such components. Additionally, the proposed placement of the cooling package 150 may allow for the intake of cooler, fresher air from the more forward the machine 99, that is, through the intake 190 rearward the cab 122, but forward the engine compartment 140. As a result, the proposed arrangement may allow for the inclusion of a smaller cooling package 150 than traditionally incorporated in such machines 100.

Additionally, placement of louder components aft the cooling package 150 may be advantageous with regard to dissipation of sound that may otherwise reach the operator 180 within the cab 122. Particularly with movement of the machine 99, a portion of the sound generated by components such as the engine 144, pumps 146 of the hydraulic system, and aftertreatment equipment 156 may be projected aft the machine 99, as opposed to forward the engine compartment 140, toward the operator 180 located in the cab 122. Moreover, the cooling system 150 itself may act as a "white noise" generator of sorts, likewise reducing potential discomfort for the operator 180.

The proposed packaging arrangement may additionally provide enhanced sightline to an operator 180 disposed within the cab 122, without the inclusion of costly supplemental equipment, such as cameras. Elimination of the need for such cameras and support equipment not only reduces associated investment costs, but eliminates the ongoing time and costs associated with repair and maintenance of such equipment, as well as upgrades.

It will be appreciated that the foregoing description provides examples of the disclosed arrangement. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine for use on terrain, the machine comprising
   a mainframe,
   a cab disposed on the mainframe,
   at least two ground engaging members rotatably coupled to the mainframe,
   an engine compartment defined along the mainframe,
   an engine coupled to the mainframe and disposed within the engine compartment,
   a cooling package including a radiator coupled to the mainframe and disposed within the engine compartment, the radiator being at least partially vertically disposed, the radiator being disposed forward the engine and rearward the cab,
   at least one enclosure adapted to at least partially enclose the engine compartment, the cab and the enclosure are spaced from one another to form a gap therebetween, the enclosure including at least one air intake forward the radiator and rearward the cab and in line between the radiator and the cab.

2. The machine of claim 1 wherein the air intake opens from the enclosure into the gap.

3. The machine of claim 1 wherein the radiator is disposed substantially vertically and in a substantially lateral orientation within the enclosure.

4. The machine of claim 1 wherein the enclosure is disposed at substantially its most distant point from the terrain in a vicinity of the radiator.

5. The machine of claim 1 wherein the cooling package includes at least one of a hydraulic fluid cooling system, an engine coolant cooling system adapted to receive engine coolant, and an engine air cooling system.

6. The machine of claim 5 wherein the radiator is adapted to receive engine coolant.

7. The machine of claim 1 wherein the air intake includes a plurality of intake openings.

8. The machine of claim 1 wherein the cooling package further includes at least one fan, the fan being disposed rearward the radiator and being adapted to pull air into the enclosure through the air intake and past the radiator.

9. The machine of claim 1 wherein the mainframe includes a front frame section and a rear frame section, the frame sections being articulated relative to one another, the ground engaging members being rotatably coupled to the rear frame section, the engine and the cooling package being coupled to the rear frame section, the machine including a third ground engaging member, said third ground engaging member being rotatably coupled to the front frame section.

10. A machine comprising
    a mainframe,
    a cab disposed on the mainframe,
    at least two ground engaging members rotatably coupled to the mainframe, the ground engaging members being adapted to turn about respective axes, the axes defining a plane within the machine,
    an engine having a crankshaft having a centerline,
    a cooling package including a radiator,
    the centerline of the crankshaft being disposed below the plane or within substantially 250 mm or less above the plane.

11. The machine of claim 10 wherein the machine is hydrostatically or electronically motivated.

12. The machine of claim 10 further comprising
    an engine compartment defined along the mainframe, the engine being coupled to the mainframe and disposed within the engine compartment,
    the cooling package being coupled to the mainframe and disposed within the engine compartment, the cooling package being disposed rearward the cab and at least partially forward the engine.

13. The machine of claim 12 further comprising aftertreatment equipment, said aftertreatment equipment being relatively disposed at least partially rearward the engine and the cooling package, the aftertreatment equipment being disposed relatively lower in the engine compartment than the cooling package.

14. The machine of claim 10 further comprising an engine compartment defined along the mainframe and at least one enclosure adapted to at least partially enclose the engine compartment, the radiator is disposed substantially vertically and laterally in the machine, the enclosure being disposed at substantially its most distant point from a terrain below the machine in a vicinity of the radiator, the enclosure including at least one air intake forward the radiator and rearward the cab and in line between the radiator and the cab.

15. A motor grader adapted to carry an operator, the motor grader comprising
   a mainframe including a front frame section and a rear frame section,
   at least one front wheel rotatably coupled to the front frame section,
   at least two ground engaging members rotatably coupled to the rear frame section,
   an engine coupled to the rear frame section,
   at least one pump coupled to the rear frame section,
   a cooling package including a radiator coupled to the rear frame section, and
   a cab disposed on the mainframe, the cab adapted to carry the operator,
   an enclosure coupled to the rear frame section rearward the cab and generally covering at least a portion of the engine, the pump, and the cooling package, the enclosure including an upper surface, the upper surface being disposed at an angle substantially on the order of 15° or greater to horizontal, the enclosure being disposed to provide the operator a sightline to a one and one half meter high obstacle disposed one meter from the motor grader.

16. The motor grader of claim 15 wherein the enclosure includes side walls and a rear wall, the side walls angling outward from the upper surface.

17. The motor grader of claim 15 wherein the motor grader is hydrostatically or electronically driven.

18. The motor grader of claim 15 wherein the radiator is at least partially vertically disposed, the radiator being disposed forward the engine and rearward the cab, the upper surface of the enclosure being disposed at substantially its most distant point from a terrain below the motor grader in a vicinity of the radiator.

19. The motor grader of claim 15 wherein the enclosure includes at least one air intake forward the radiator and rearward the cab and in line between the radiator and the cab.

20. The motor grader of claim 19 further comprising
   an engine compartment, the enclosure at least partially enclosing the engine compartment,
   the radiator being disposed substantially vertically and in a substantially lateral orientation within the enclosure, the enclosure being disposed at substantially its most distant point from a terrain below the motor grader in a vicinity of the radiator,
   the cab and the enclosure being spaced from one another to form a gap therebetween,
   the enclosure including at least one air intake forward the radiator and rearward the cab and in line between the radiator and the cab, the air intake opening from the enclosure into the gap, and
   the cooling package further including at least one fan, the fan being disposed rearward the radiator and being adapted to pull air into the enclosure through the air intake and past the radiator.

\* \* \* \* \*